(12) United States Patent
Shrader et al.

(10) Patent No.: US 6,775,771 B1
(45) Date of Patent: Aug. 10, 2004

(54) METHOD AND SYSTEM FOR PRESENTATION AND MANIPULATION OF PKCS AUTHENTICATED-DATA OBJECTS

(75) Inventors: Theodore Jack London Shrader, Austin, TX (US); Anthony Joseph Nadalin, Austin, TX (US); Bruce Arland Rich, Round Rock, TX (US); Julianne Yarsa, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/460,840

(22) Filed: Dec. 14, 1999

(51) Int. Cl.[7] .............................. H04L 9/00; H04K 1/00
(52) U.S. Cl. ....................... 713/167; 713/156; 713/157; 713/158; 380/29; 380/30
(58) Field of Search ................................ 713/167, 157, 713/158, 156; 380/29, 30

(56) References Cited

U.S. PATENT DOCUMENTS

| | | | | |
|---|---|---|---|---|
| 5,497,422 A | * | 3/1996 | Tysen et al. ................. | 713/157 |
| 6,061,794 A | * | 5/2000 | Angelo et al. ............... | 713/200 |
| 6,185,684 B1 | * | 2/2001 | Pravetz et al. .............. | 713/182 |
| 6,199,052 B1 | | 3/2001 | Mitty et al. .................... | 705/75 |
| 6,205,549 B1 | * | 3/2001 | Pravetz ........................ | 713/182 |
| 6,356,937 B1 | | 3/2002 | Montville et al. ........... | 709/206 |
| 6,367,012 B1 | * | 4/2002 | Atkinson et al. ........... | 713/176 |

OTHER PUBLICATIONS

Housley, R; Crytographic Message Syntax, Jun. 1999; pp. 23–27.*

Housley, R.; Cryptographic Message Syntax; Jun. 1999; pp. 1–52.

Kaliski, B.; PKCS #10: Certification Request Syntax Version 1.5; Mar. 1998; pp. 1–7.

Kaliski, Burton S.; An Overview of the PKCS Standards; Nov. 1, 1993; pp. 1–27.

PKCS #7: Crytographic Message Syntax Standard; Nov. 1, 1993; pp. 1–30.

Kaliski, B.; Extensions and Revisions to PKCS #7; May 13, 1997; pp. 1–6.

* cited by examiner

*Primary Examiner*—Matthew Smithers
*Assistant Examiner*—Courtney D. Fields
(74) *Attorney, Agent, or Firm*—Duke W. Yee; Volel Emile; Wayne P. Bailey

(57) ABSTRACT

A method and system for processing authenticated data objects. An authenticated data object utility allows a user to view and edit the contents of data objects embedded within an authenticated data object via a graphical user interface. Graphical objects represent the data objects embedded within an authenticated data object. A user may drag and drop objects onto other objects within the authenticated data object, and the authenticated data object utility automatically performs the necessary authenticating operations. Logical associations between data objects contained within the authenticated data object, such as between certificates and recipient information objects, are determined or created, and the logical associations are displayed using visual indicators. As data objects are added or deleted through user actions on the graphical objects, the visual indicators are updated to reflect any updates to the logical associations between the data objects.

46 Claims, 9 Drawing Sheets

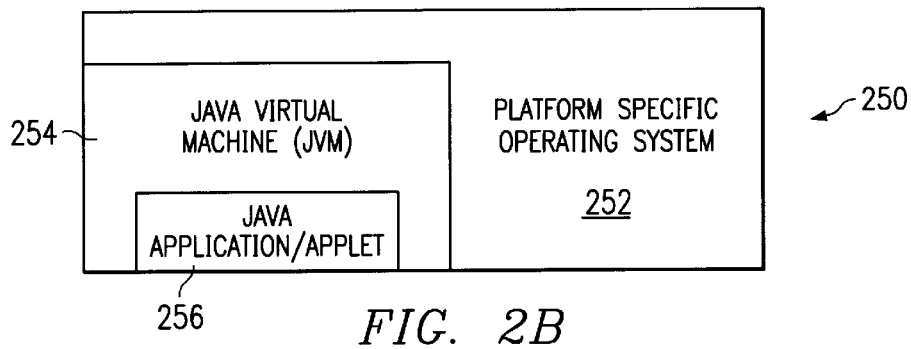

FIG. 2B

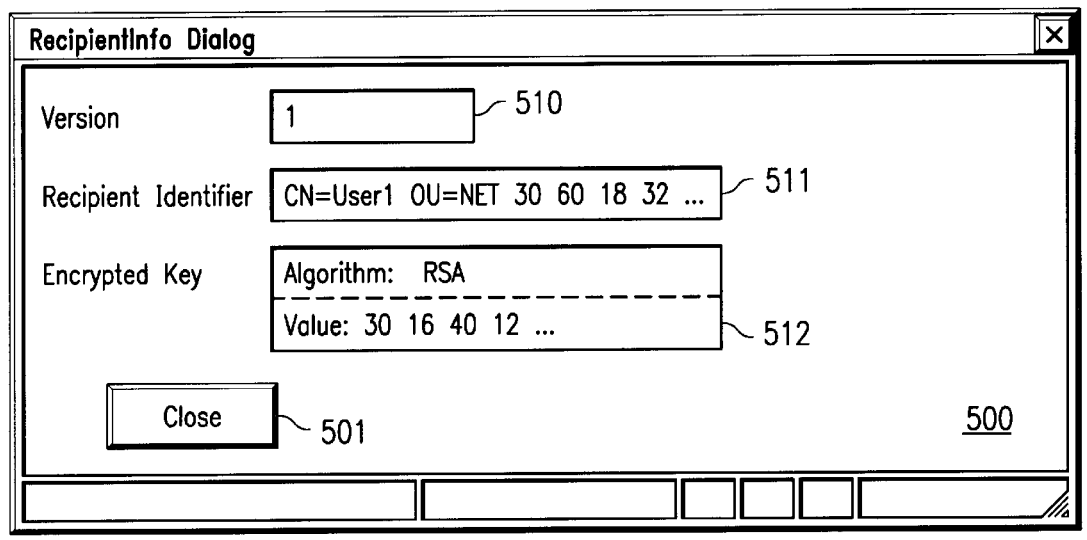

FIG. 5A

```
RecipientInfo ::= CHOICE {
    ktri KeyTransRecipientInfo,
    kari [1] KeyAgreeRecipientInfo,
    kekri [2] KEKRecipientInfo }

KeyTransRecipientInfo ::= SEQUENCE {
    version CMSVersion, -- always set to 0 or 2
    rid RecipientIdentifier,
    keyEncryptionAlgorithm KeyEncryptionAlgorithmIdentifier,
    encryptedKey EncryptedKey }

RecipientIdentifier ::= CHOICE {
    issuerAndSerialNumber IssuerAndSerialNumber,
    subjectKeyIdentifier [0] SubjectKeyIdentifier }
```

FIG. 5B

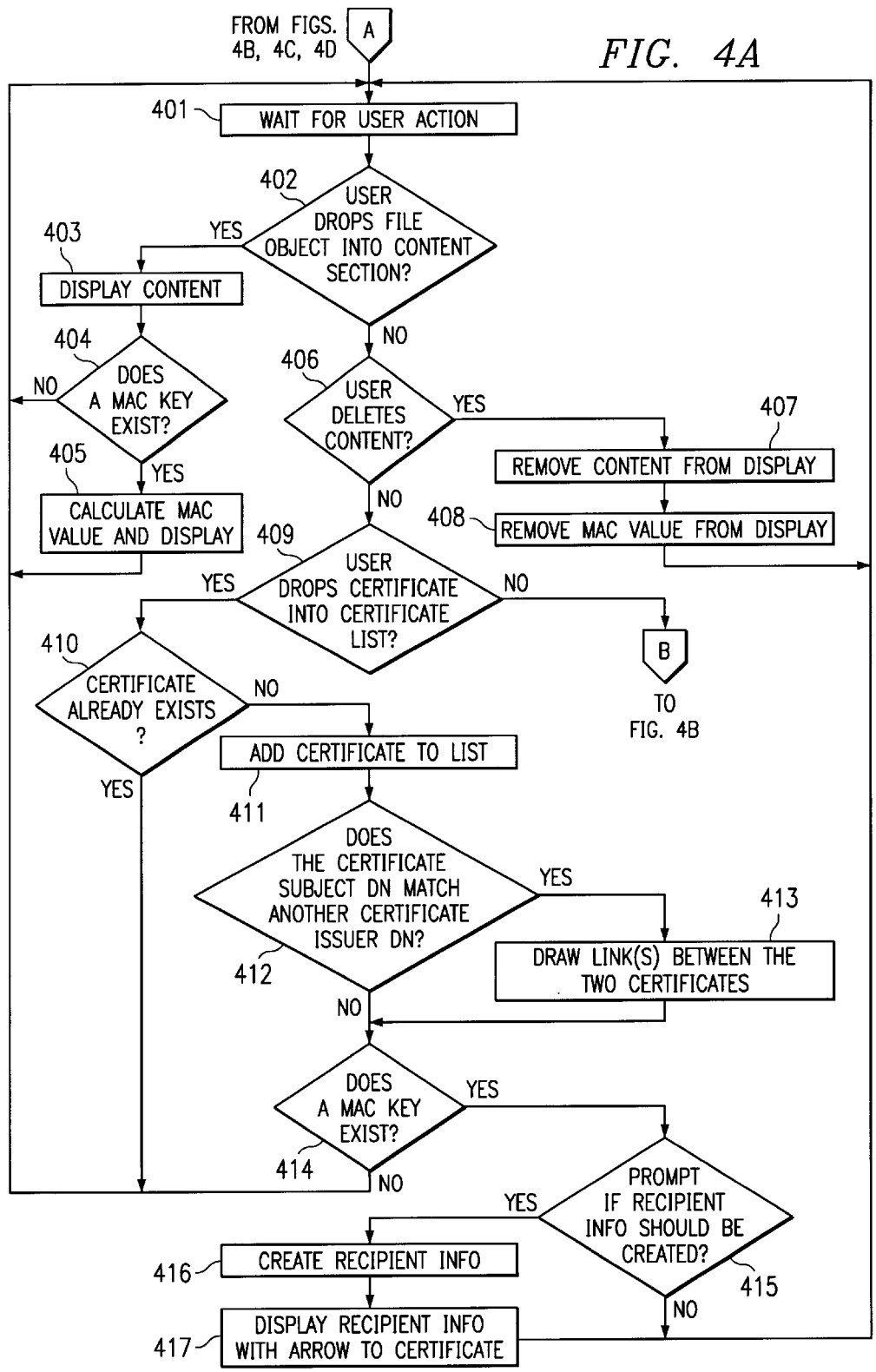

METHOD AND SYSTEM FOR PRESENTATION AND MANIPULATION OF PKCS AUTHENTICATED-DATA OBJECTS

CROSS-REFERENCE TO RELATED APPLICATIONS

The present invention is related to the following applications entitled "METHOD AND SYSTEM FOR PRESENTATION AND MANIPULATION OF PKCS SIGNED-DATA OBJECTS", U.S. application Ser. No. 09/460,838, "METHOD AND SYSTEM FOR PRESENTATION AND MANIPULATION OF PKCS CERTIFICATION REQUESTS", U.S. application Ser. No. 09/460,837, and "METHOD AND SYSTEM FOR PRESENTATION AND MANIPULATION OF PKCS ENVELOPED-DATA OBJECTS", U.S. application Ser. No. 09/460,839, all of which are assigned to the same assignee.

BACKGROUND OF THE INVENTION

1. Technical Field

The present invention relates generally to an improved data processing system and, in particular, to a method and apparatus for processing cryptographic data objects formatted according to interoperable standards.

2. Description of Related Art

Public-key cryptography is the technology in which encryption and decryption involve different keys. The two keys are the public key and the private key, and either can encrypt or decrypt data. A user gives his or her public key to other users, keeping the private key to himself or herself. Data encrypted with a public key can be decrypted only with the corresponding private key, and vice versa.

As public-key cryptography has gained acceptance, standards have become necessary so that software at two different sites could work together even when the software is developed by different vendors. In particular, standards have been developed to allow agreement on digital signatures, digital enveloping, digital certification, and key agreement. However, interoperability requires strict adherence to communicable formats, and PKCS, or "Public Key Cryptography Standard," provides a basis for interoperable standards in heterogeneous environments.

PKCS is a set of documents published by RSA Laboratories that serves to define data types and algorithms used in public-key cryptography. The first set of ten PKCS standards was released in 1991. In the 1993 release PKCS #2 and #4 were incorporated into PKCS #1, so the set of standards included:

PKCS #1: RSA Encryption Standard;
PKCS #3: Diffie-Hellman Key Agreement Standard;
PKCS #5: Password-Based Encryption Standard;
PKCS #6: Extended-Certificate Syntax Standard;
PKCS #7: Cryptographic Message Syntax Standard;
PKCS #8: Private-Key Information Syntax Standard;
PKCS #9: Selected Attribute Types; and
PKCS #10: Certification Request Syntax Standard.

PKCS continues to evolve and the following standards have been added since 1993:

PKCS #11: Cryptographic Token Interface Standard;
PKCS #12: Personal Information Exchange Syntax Standard;
PKCS #13: Elliptic Curve Cryptography Standard; and
PKCS #15: Cryptographic Token Information Format Standard.

Two independent levels of abstraction have been provided by these standards. The first level is message syntax, and the second level is specific algorithms. The intention has been that message syntax and specific algorithms should be orthogonal. In other words, a standard for the syntax of digitally signed messages should be able to work with any public-key algorithm, not just RSA, the public-key algorithm invented by Rivest, Shamir, and Adleman involving exponentiation modulo the product of two large prime numbers; and a standard for RSA should be applicable to many different message syntax standards.

One of these standard documents, PKCS #9, defines a set of attributes that can be used in other PKCS standards. In particular, PKCS #9 defines selected attribute types for use in PKCS #6 extended certificates, PKCS #7 digitally signed messages, PKCS #8 private-key information, PKCS #12 personal information, and PKCS #15 cryptographic token information.

PKCS #7 describes a general syntax for data that may have cryptography applied to it. In other words, PKCS #7 defines the syntax for several cryptographically protected messages, including encrypted messages and messages with digital signatures. The syntax admits recursion, so that one envelope can be nested inside another or one party can sign previously enveloped digital data. PKCS #7 also allows arbitrary attributes, such as signing time, to be authenticated along with the content of a message, and it also provides for other attributes, such as countersignatures, to be associated with a signature. A degenerate case of the syntax provides a means for disseminating certificates and certificate-revocation lists. PKCS #7 can also support a variety of architectures for certificate-based key management.

Originally an outgrowth of Internet Privacy-Enhanced Mail, PKCS #7 has become the basis for the widely implemented Secure/Multipurpose Internet Mail Extensions (S/MIME) secure electronic mail specification, an Internet e-mail security standard that employs public key encryption. PKCS #7 has become a basis for message security in systems as diverse as the Secure Electronic Transaction (SET) specification for bank systems.

PKCS #7 is compatible with Privacy-Enhanced Mail (PEM) in that signed-data and signed-and-enveloped-data content, constructed in a PEM-compatible mode, can be converted into PEM messages without any cryptographic operations. A PEM message can similarly be converted into the signed-data and signed-and-enveloped-data content types, i.e. a form that can be processed by applications including or implementations including PKCS #7 without any cryptographic operations. The conversion process is "flat" in the sense that the encapsulated text of the PEM message becomes the "inner" content of the PKCS #7 data. If the encapsulated text happens to contain privacy-enhanced messages, those messages are not implemented in the conversion process. PEM can effectively be viewed as a set of encoding rules analogous to the Basic Encoding Rules for ASN.1, abbreviated BER, for PKCS #7 data with these restrictions. Conversion from PKCS #7 to PEM may involve omission of attributes from PKCS #6 extended certificates, which is acceptable since the attributes are not essential to PEM.

The values produced according to PKCS #7 are intended to be BER-encoded. Abstract Syntax Notation One, abbreviated ASN.1, is a notation for describing abstract types and values. The Basic Encoding Rules for ASN.1 give one or more ways to represent any ASN.1 value as an octet string. The Distinguished Encoding Rules for ASN.1, abbreviated DER, are a subset of BER, and give exactly one way to represent any ASN.1 value as an octet string. DER is intended for applications in which a unique octet string encoding is needed, as is the case when a digital signature is computed on an ASN.1 value. ASN.1 and DER encoding are general purpose methods that can be applied to many domains in addition to PKCS.

A PKCS #7 AuthenticatedData object and the objects that may be contained within a AuthenticatedData object are defined in RFC 2630, "Cryptographic Message Syntax", June 1999, which, at the time the present application was filed, was available in a file called rfc2630.txt located at a web site operated by the Internet Engineering Task Force (IETF) named ietf.org. Within this standard, the AuthenticatedData definition includes the object version number, the content, a set of certificates, a set of Certificate Revocation Lists (CRLs), and at least one RecipientInfo object that provides per-recipient information.

AuthenticatedData objects were designed for a heterogeneous environment in which the AuthenticatedData object and the objects within it can be DER-encoded into a stream of bytes. The DER encoding can be transferred from one system to a completely different system and decoded to reform the AuthenticatedData object.

With all the attributes that are part of a AuthenticatedData object, administrators, applications developers, and other users can easily be lost in details. They may have access to all the integral objects used in creating a AuthenticatedData object, a certificate file, and a private key file, but they may lack the application or means to merge the objects together to create a AuthenticatedData object. In other situations, users may receive a AuthenticatedData object as an external file or as part of an S/MIME object for which they do not have a targeted application or that they do not wish to be automatically included in a targeted application.

Therefore, it would be advantageous to have an improved method and system for presenting and manipulating secure data objects using interoperable standards within heterogeneous environments, such as using PKCS within a distributed computing environment. It would be still more advantageous to provide users with a method and system to graphically construct a PKCS AuthenticatedData object as well as view and manipulate a AuthenticatedData object that has been stored or received.

SUMMARY OF THE INVENTION

A method and system for processing authenticated data objects in a data processing system is presented. The authenticated data object may be formatted, i.e. may maintain a syntax, as defined by PKCS (Public Key Cryptography Standard) standards. An authenticated data object utility allows a user to view and edit the contents of data objects embedded within an authenticated data object via a graphical user interface. Graphical objects represent the data objects embedded within an authenticated data object. A user may drag and drop objects onto other objects within the authenticated data object, and the authenticated data object utility automatically performs the necessary authenticating operations. Logical associations between data objects contained within the authenticated data object, such as between certificates and recipient information objects, are determined or created, and the logical associations are displayed using visual indicators, such arrows or other links, between graphical objects representing the associated data objects. As data objects are added or deleted through user actions on the graphical objects, the visual indicators are updated to reflect any updates to the logical associations between the data objects. The user may direct other operations on the authenticated data object through the graphical user interface.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2B is a block diagram illustrating the relationship of software components operating within a computer system that may implement the present invention;

FIGS. 4A–4D depict a flowchart depicting the processing of user actions within a dialog window of a AuthenticatedData interface utility for viewing and manipulating AuthenticatedData objects, such as the AuthenticatedData object shown in FIG. 3;

FIG. 5A depicts a dialog window for presenting RecipientInfo object information for a RecipientInfo object selected by a user within a AuthenticatedData interface utility dialog window;

FIG. 5B is the format of a RecipientInfo object data type;

DETAILED DESCRIPTION OF THE PREFERRED EMBODIMENT

Figure 1:
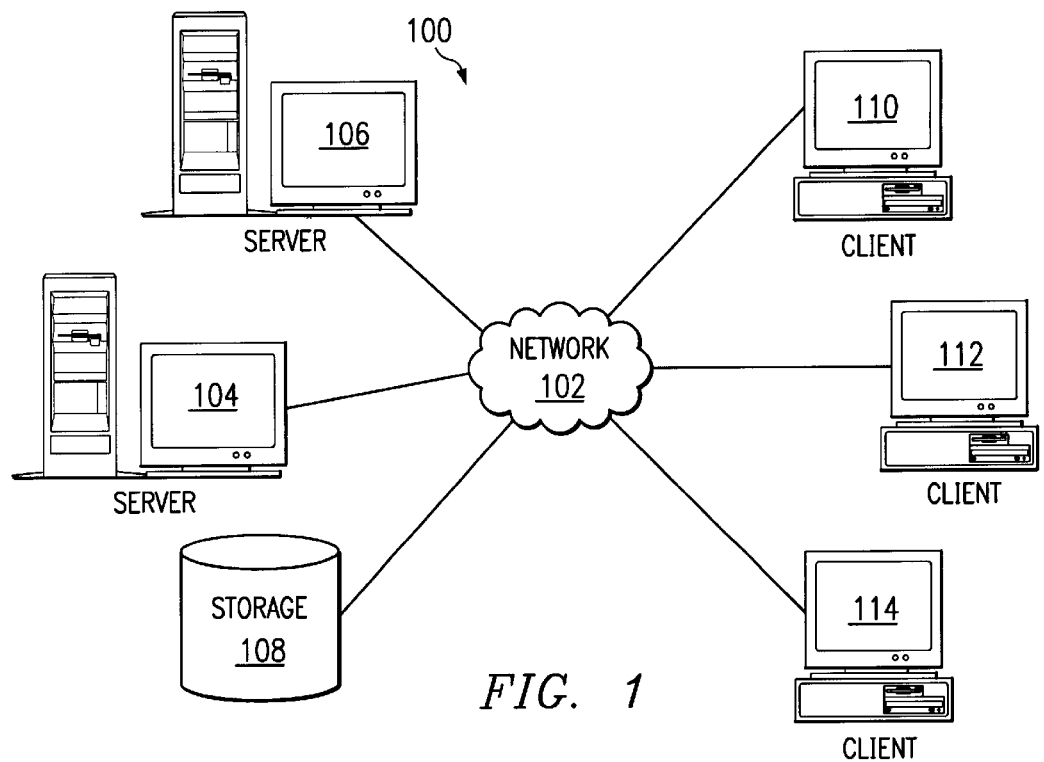
FIG. 1 is a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 and server 106 is connected to network 102 along with storage unit 108. In addition, clients 110, 112, and 114 also are connected to network 102. These clients 110, 112, and 114 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 110–114.

Clients 110, 112, and 114 are clients to server 104. Additionally, clients 110–114 also may be clients to server 106 in these examples. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems that route data and messages. Of course, distributed data processing system 100 also may be implemented as a number of different types of networks, such as, for example, an intranet, a local area network (LAN), or a wide area network (WAN). FIG. 1 is intended as an example of a heterogeneous computing environment and not as an architectural limitation for the present invention.

Figure 2A:
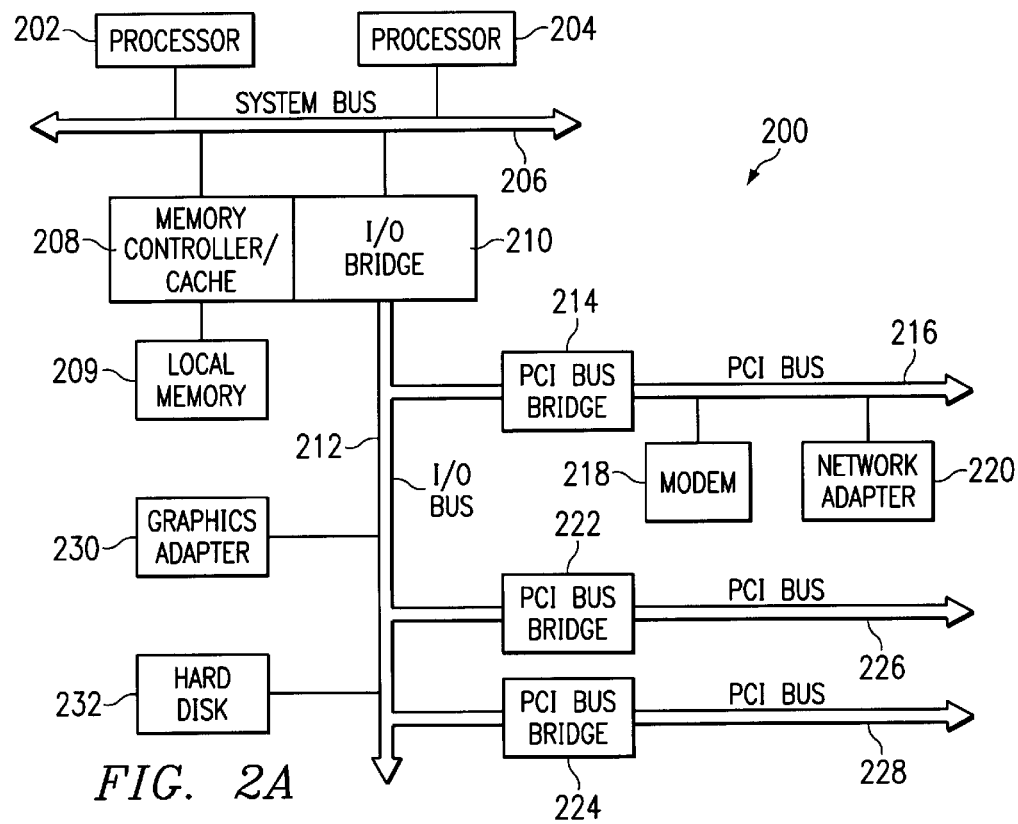
FIG. 2A is a block diagram depicting a data processing system that may be implemented as a server.

With reference now to FIG. 2A, a block diagram depicting a data processing system that may be implemented as a server, such as server 104 or server 106 in FIG. 1. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus. 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2A may vary. For example, other peripheral devices, such as optical disk drives and the like, also may be used in addition to or in place of the hardware depicted. The depicted example is not meant to imply architectural limitations with respect to the present invention. The data processing system depicted in FIG. 2A may be, for example, an IBM RISC/System 6000 system, a product of International Business Machines Corporation in Armonk, N.Y., running the Advanced Interactive Executive (AIX) operating system. Alternatively, the operating system may be another commercially available operating system such as JavaOS For Business™ or OS/2™, which are also available from IBM. JavaOS is loaded from a server on a network to a network client and supports Java programs and applets. An object oriented programming system such as Java may run in conjunction with the operating system and may provide calls to the operating system from Java programs or applications executing on the data processing system.

The present invention provides a method, a system or apparatus, and computer-implemented instructions for processing cryptographic data objects on a variety of computer platforms and operating systems. Although the present invention could be implemented in most computer languages, it is preferably implemented in Java due to the ability to run Java code in a distributed, heterogeneous environment. Hence, the present invention may operate within a Java runtime environment and operate in conjunction with a Java virtual machine (JVM) yet within the boundaries of a JVM as defined by Java standard specifications. In order to provide a context for the present invention, portions of the operation of a JVM according to Java specifications are herein described.

With reference now to FIG. 2B, a block diagram illustrates the relationship of software components operating within a computer system that may implement the present invention. Java-based system 250 contains platform specific operating system 252 that provides hardware and system support to software executing on a specific hardware platform. JVM 254 is one software application that may execute in conjunction with the operating system. JVM 254 provides a Java runtime environment with the ability to execute Java application or applet 256, which is a program, servlet, or software component written in the Java programming language. The computer system in which JVM 254 operates may be similar to data processing system 200 described above. However, JVM 254 may be implemented in dedicated hardware on a so-called Java chip, Java-on-silicon, or Java processor with an embedded picoJava core.

At the center of a Java runtime environment is the JVM, which supports all aspects of Java's environment, including its architecture, security features, mobility across networks, and platform independence. The JVM is a virtual computer, i.e. a computer that is specified abstractly. The Java specifications define certain features that every JVM must implement, with some range of design choices that may depend upon the platform on which the JVM is designed to execute. For example, all JVMs must execute Java bytecodes and may use a range of techniques to execute the instructions represented by the bytecodes. A JVM may be implemented completely in software or somewhat in hardware. This flexibility allows different JVMs to be designed for hardware platforms, such as mainframe computers and PDAs.

The JVM is the name of a virtual computer component that actually executes Java programs. Java programs are not run directly by the central processor but instead by the JVM, which is itself a piece of software running on the processor. The JVM allows Java programs to be executed on a different platform as opposed to only the one platform for which the code was compiled. Java programs are compiled for the JVM. In this manner, Java is able to support applications for many types of data processing systems, which may contain a variety of central processing units and operating systems architectures.

The data processing systems described above with respect to FIGS. 1–2B may be used to create, modify, transmit, store, and receive cryptographic data objects formatted according to interoperably defined cryptography standards, and in particular, PKCS #7 AuthenticatedData objects. The following discussion provides background information on the utility of certificates, signatures, etc.

A certificate is a digital document that vouches for the identity and key ownership of an individual, a computer system, a specific server running on that system, or an organization. For example, a user's certificate verifies that the user owns a particular public key. Certificates are issued by certificate authorities. These authorities are responsible for asserting the identity and key ownership of the individual before issuing the certificate. An identity certificate is a digitally signed statement from one entity, saying that the public key of some other entity has some particular value.

Public keys are numbers associated with a particular entity, and are intended to be known to everyone who needs to have trusted interactions with that entity. An entity is a person, organization, program, computer, business, bank, etc. If data is digitally signed, it has been stored with the "identity" of an entity and a signature that proves that entity knows about the data. A signature is computed from some data and the private key of an entity.

Private keys are numbers that are supposed to be known only to a particular entity, i.e. kept secret. In a typical public key cryptographic system, a private key corresponds to exactly one public key.

Certificates rely on public key cryptographic systems in which (a) private and public keys are paired, (b) private keys are used to sign, and (c) public keys are used to verify signatures. A certificate authority (CA) is an entity (e.g., a business) that is trusted to sign (issue) certificates for other people (entities). It usually has some kind of legal responsibilities for its vouching of the binding between a public key and its owner that allow one to trust the entity that signed a certificate.

There are two basic techniques used to get certificates: (1) make one oneself using the proper software, or (2) ask someone else, such as a certificate authority, to issue one. There are two main inputs to the certificate creation process. The first input is a pair of matched public and private keys generated using some cryptographic software. Usually only the public key is ever shown to anyone else. One usage of a private key is to sign data; if someone improperly knows a private key, they can forge legal documents attributed to a third party. The second input is information about the entity being certified, such as an individual. This normally includes information such as a name and organization address. If a certificate authority issues a certificate, one will normally need to provide proof of identity.

If a certificate authority issues a certificate for an individual, the individual must provide a public key pair and some information about himself. A tool, such as Netscape Navigator, may digitally sign this information and send it to the certificate authority. The certificate authority might be a company that provides trusted third-party certificate authority services. The certificate authority will then generate the certificate and return it. The certificate may contain other information, such as dates during which the certificate is valid and a serial number. One part of the value provided by a certificate authority is to serve as a neutral and trusted introduction service, based in part on their verification requirements, which are openly published in their Certification Service Practices (CSP).

The X.509 standard is one of many standards that defines what information can go into a certificate and describes the data format of that information. The "version" field indicates the X.509 version of the certificate format (1, 2, or 3), with provision for future versions of the standard. This identifies which version of the X.509 standard applies to this certificate, which affects what information can be specified in it. Thus far, three versions are defined. Version 1 of the X.509 standard for public key certificates was ratified in 1988. The version 2 standard, ratified in 1993, contained only minor enhancements to the version 1 standard. Version 3, defined in 1996, allows for flexible extensions to certificates in which certificates can be "extended" in a standardized and generic fashion to include additional information. In addition to the traditional fields in public key certificates (i.e. those defined in versions 1 and 2 of X.509), version 3 comprises extensions referred to as "standard extensions". The term "standard extensions" refers to the fact that the version 3 X.509 standard defines some broadly applicable extensions to the version 2 certificate. However, certificates are not constrained to only the standard extensions and anyone can register an extension with the appropriate authorities (e.g., ISO). The extension mechanism itself is completely generic.

The "serial number" field specifies the unique, numerical identifier of the certificate in the domain of all public key certificates issued by a particular certificate authority (CA) in order to distinguish one certificate from another. When a certificate is revoked, it is actually the certificate serial number that is posted in a certificate revocation list signed by the certificate authority since posting the entire certificate would be wasteful and completely unnecessary. It is for this reason that the serial number for each certificate in the domain must be unique. The "signature algorithm" field identifies the algorithm used by the certificate authority to sign the certificate. The algorithm identifier, which is a number registered with an internationally-recognized standards organization (e.g., ISO), specifies both the public-key algorithm and the hashing algorithm used by the certificate authority to sign certificates.

The "issuer name" field specifies the X.500 Distinguished Name (DN) of the certificate authority that issued the certificate. For example, the Distinguished Name "c=US, o=ACME Corporation" might be used as the Distinguished Name for the certificate authority issuing certificates to the employees of the ACME Corporation in the United States. In some cases, such as root or top-level certificate authority certificates, the issuer signs its own certificates. The "validity period" field specifies the dates and times for the start date and the expiration date of the certificate. Every time a certificate is used, the software should examine the certificate to ensure it is still within its validity period. Each certificate is valid only for a limited amount of time, but this period can be as short as a few seconds or almost as long as a century. The validity period depends on a number of factors, such as the strength of the private key used to sign the certificate or the amount one is willing to pay for a certificate.

The "subject name" field specifies the X.500 Distinguished Name of the entity holding the private key corresponding to the public key identified in the certificate; for example, the Distinguished Name "c=US, o=ACME Corporation, cn=John M. Smith" might be the Distinguished Name for employee John M. Smith of the ACME corporation, where "cn" stands for "common name", "o" is "organization", and "c" is "country".

The "public key" field is the public key of the entity being named or identified by the certificate. The "subject public key information" field identifies two important pieces of information: a) the value of the public key owned by the subject, and b) the algorithm identifier specifying the algorithm with which the public key is to be used. The algorithm identifier specifies both the public-key algorithm and the hashing algorithm.

The "issuer unique identifier" field was added to the X.509 certificate definition as part of the version 2 standard.

The field, which is optional, provides a location to specify a bit string to uniquely identify the issuer X.500 name, in the event that the same X.500 name has been assigned to more than one certificate authority over time.

The "subject unique identifier" field was added to the X.509 certificate definition as part of the version 2 standard. The field, which is optional, provides a location to specify a bit string to uniquely identify the subject X.500 name, in the event that the same X.500 name has been assigned to more than one subject over time (e.g., one John M. Smith leaves ACME Corporation and a second John M. Smith joins ACME Corporation two months later). This field is not used by most certificate authorities for various reasons primarily because there are more convenient ways to uniquely identify a subject. Specifically, most certificate authorities use the serialNumber attribute. Such a scheme fits well within an organization's administrative and directory management procedures because employees require a unique identifier in their X.500 common names anyway (e.g., to handle the case where there are two John M. Smith's in the organization at the same time).

X.509 Version 1 has been available since 1988, is widely deployed, and is the most generic. X.509 Version 2 introduced the concept of subject and issuer unique identifiers to handle the possibility of reuse of subject and/or issuer names over time. Most certificate profile documents strongly recommend that names not be reused, and that certificates should not make use of unique identifiers. Version 2 certificates are not widely used.

X.509 Version 3 is the most recent (1996) and supports the notion of extensions, whereby anyone can define an extension and include it in the certificate. Some common extensions in use today are: KeyUsage, which limits the use of the keys for particular purposes such as "signing-only"; and AltNames, which allows other identities to also be associated with this public key, e.g., DNS names, e-mail addresses, IP addresses. Extensions can be marked critical to indicate that the extension should be checked and enforced/used. So, for example, if a certificate has the KeyUsage extension marked critical and set to "keyCertSign" then if this certificate is presented during SSL Communication, it should be rejected, as the certificate extension indicates that the associated private key should only be used for signing certificates and not for SSL.

The keys used to interact with various parties need to be hung in a "key chain." In the physical world, a key ring holds keys, holds multiple identification and credit cards. In the digital world, a directory service provides storage for digital keys and certificates. The X.500 and LDAP (Lightweight Directory Access Protocol) standards are two main contenders for directory services. Each entry in the directory service is globally and uniquely identified by a Distinguished Name. For example, John M. Smith, who belongs in the Executive Office department at Acme Corporation, might have the following Distinguished Name: "cn=John M. Smith, ou=Executive Office, o=ACME Corporation, c=US", where "cn" stands for "common name", "ou" is "organizational unit", "o" is "organization", and "c" is "country".

Second-generation directory services store entries in proprietary file formats, hash, B-tree, or Relational Database Management System. Although RDBMS is not necessarily optimized for X.500 Distinguished Names, the maturity, scalability and additional utilities in RDBMS make it an attractive alternative as a directory service repository. X.509v3 certificates and public keys can also be stored and protected in an X.500- or LDAP-based directory service. If a user's secret key is compromised, the certificate associated with the public key must be revoked and added to the appropriate certificate authority's Certificate Revocation List (CRL).

As noted previously, with all the attributes that are part of a AuthenticatedData object, administrators, applications developers, and other users can easily be lost in details. Such users may have access to all the integral objects used in creating a AuthenticatedData object, such as the contents, a certificate file, and a private key or keystore, but they may lack the application or means to merge the objects together to create a AuthenticatedData object.

The present invention provides a graphical user interface methodology for presenting and manipulating, in particular, PKCS #7 AuthenticatedData objects. However, the present invention may be used to view and manipulate cryptographic data objects other than PKCS #7 AuthenticatedData objects, assuming that the cryptographic data objects are formatted according to interoperably defined cryptography standards with some functional similarity to the PKCS family of standards, such as encapsulated content, certificates, certificate revocation lists, etc. Preferably, the graphical user interface and other functionality described in the following figures may be readily implemented in Java to provide the methodology of the present invention in various interoperable, heterogeneous environments.

Figure 3:
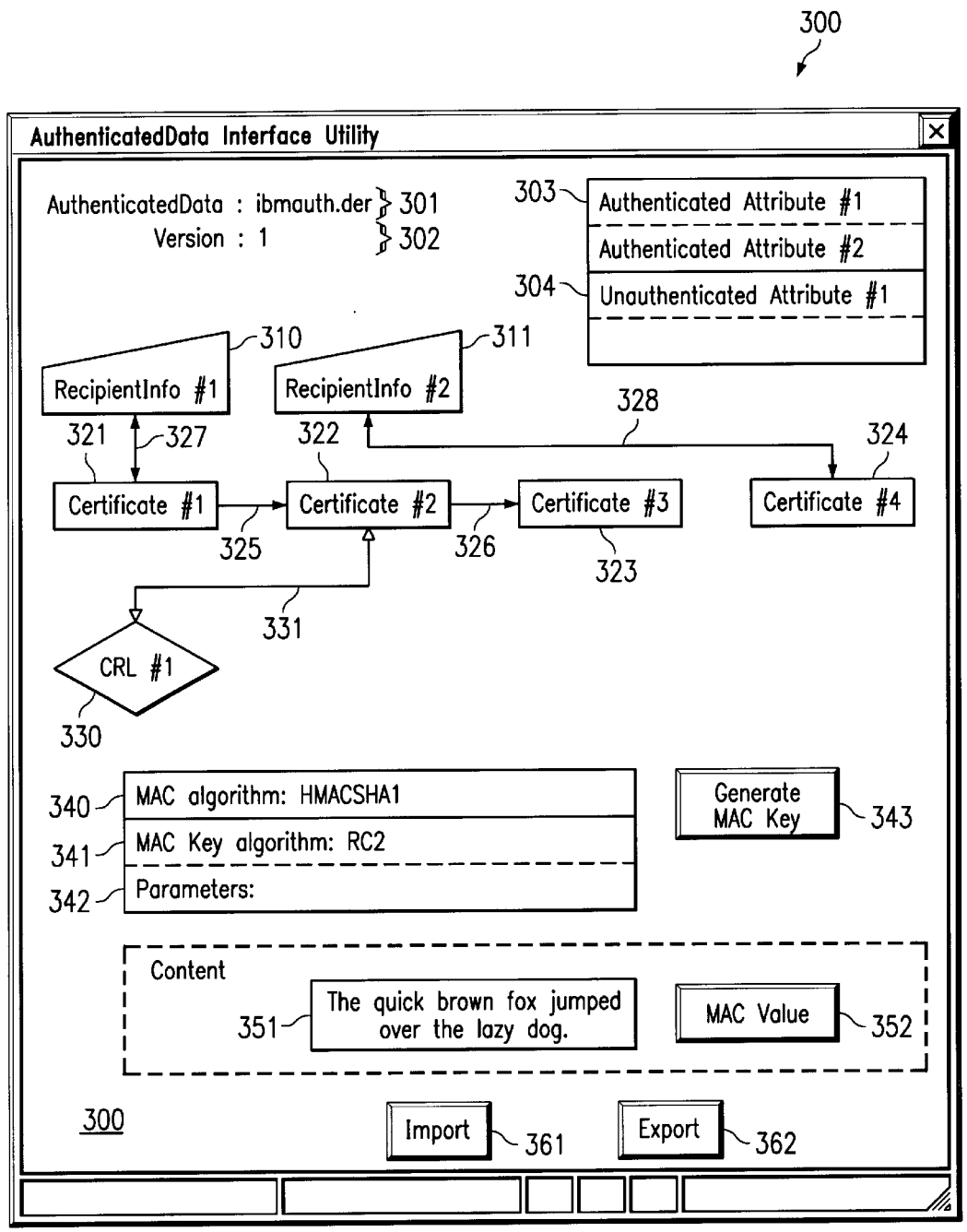
FIG. 3 depicts a dialog window for presenting and manipulating PKCS AuthenticatedData objects.
Figure 4B:
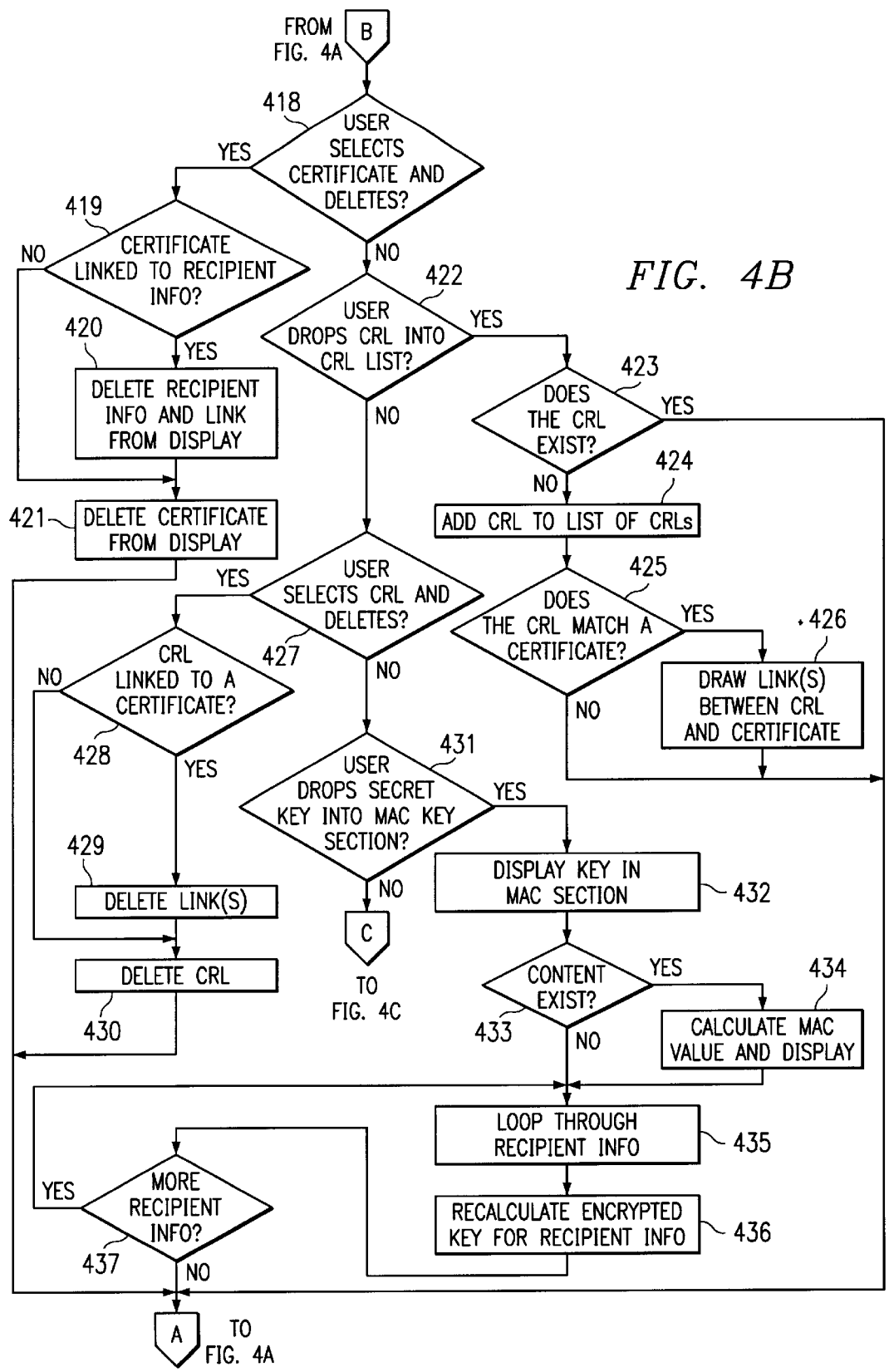
Figure 4C:
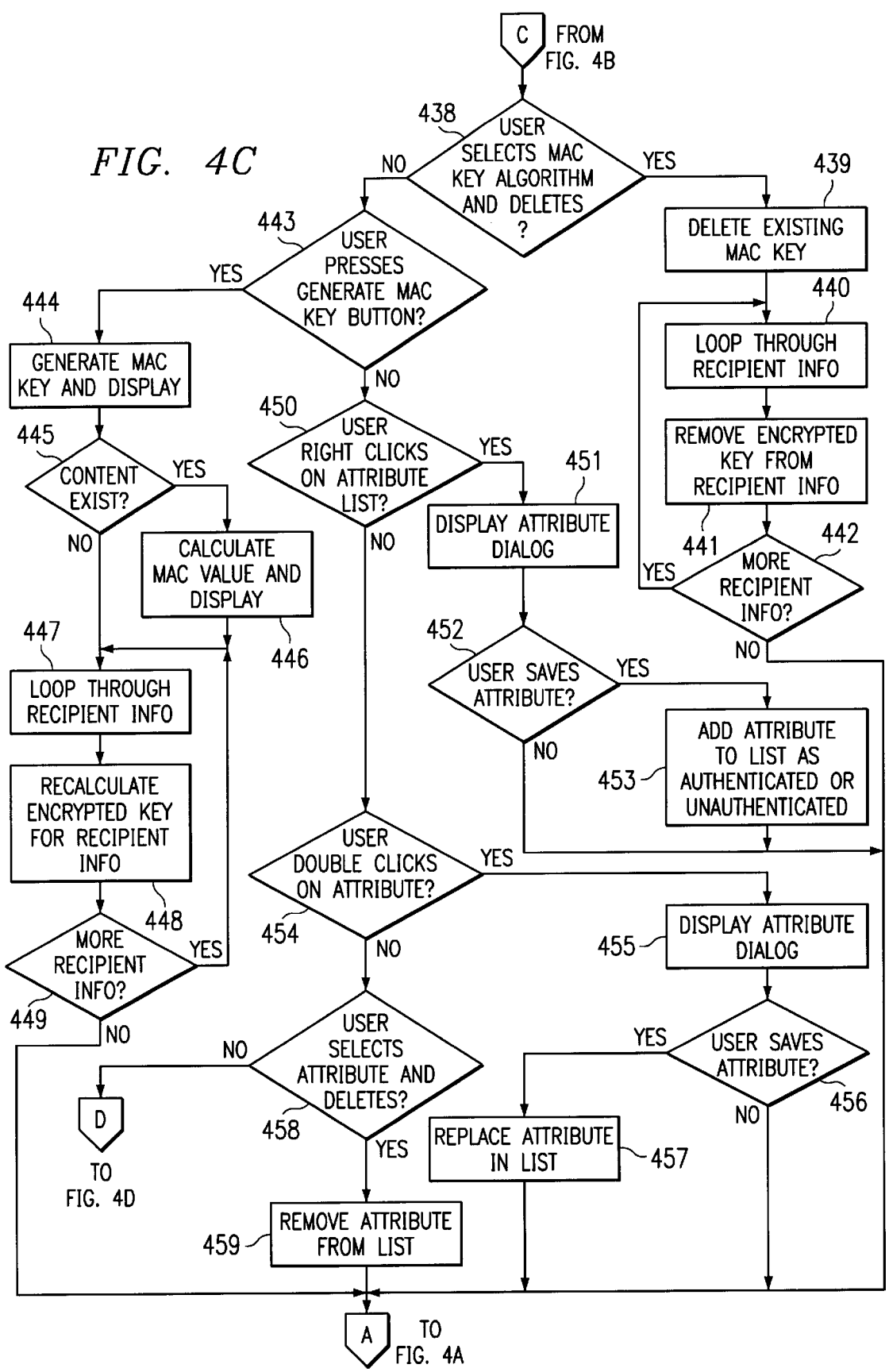
Figure 4D:
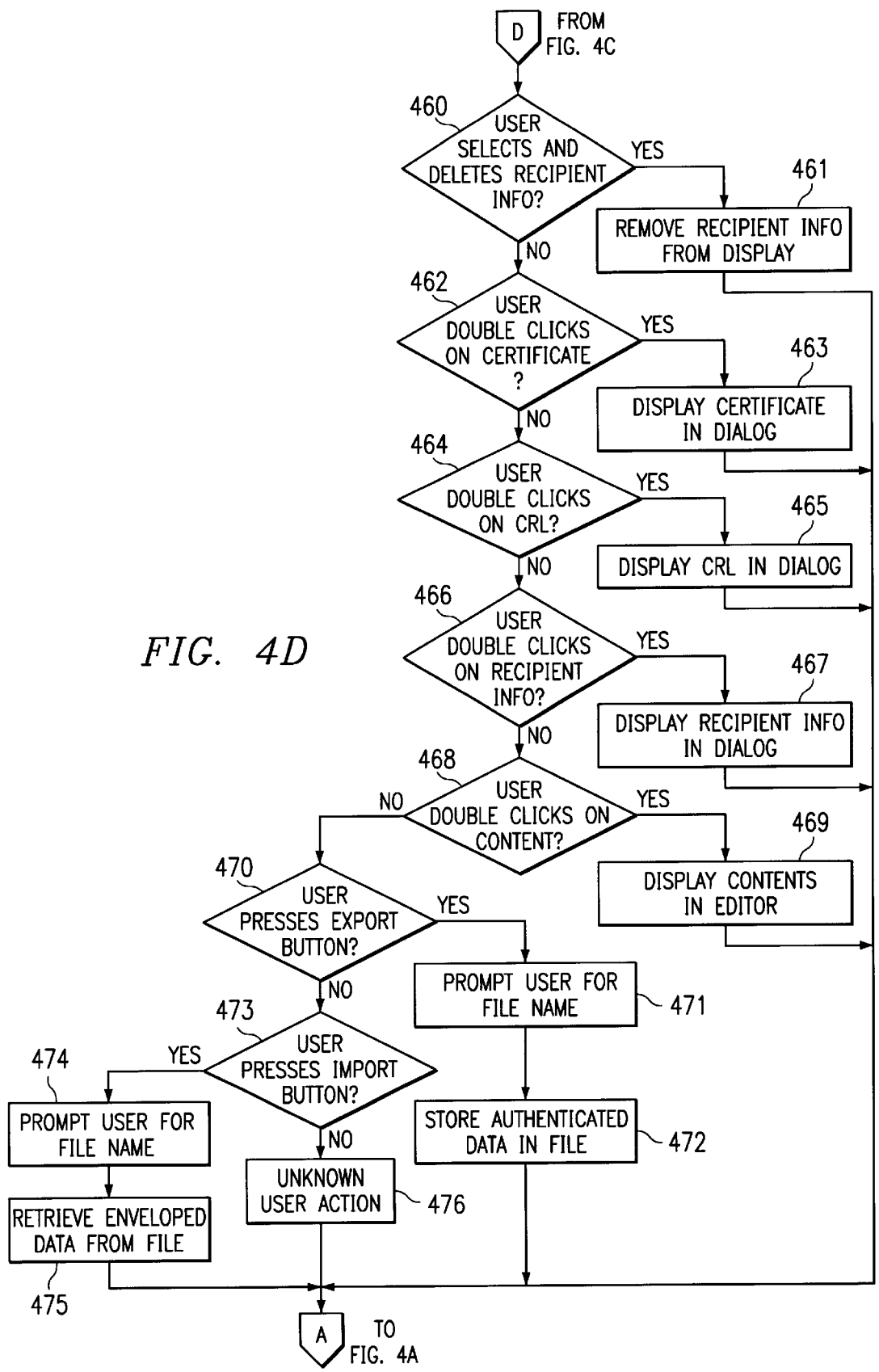

With reference now to FIG. 3, a dialog window for presenting and manipulating PKCS AuthenticatedData objects is shown in accordance with a preferred embodiment of the present invention. The dialog window provides a visual work area where AuthenticatedData objects can be created, changed, etc. The dialog window and associated functions in FIG. 3 and the subsequent figures may be implemented as a stand-alone utility or application, or the dialog window and associated functions may be implemented as an applet within a browser-type application or as a portion of some other type of application.

In the descriptions of the following figures, several common user interface events or actions are mentioned, and it should be noted that equivalent user actions may also be employed, as would be apparent to one of ordinary skill in the art. For example, when a drag and drop operation is mentioned, alternative user actions could be employed, such as selecting the file or data object from a file list box or some other import means. Double-clicking on an object would be equivalent to executing a default action on the object. This action could also be accomplished after right-clicking on the object and selecting the default action, which is usually highlighted in a graphically significant way, or via some other means. In general, users can forgo using menus for most operations.

Although areas of the visual display are used to associate similar objects, other manners of visually indicating associated objects may be employed. For example, objects of similar type may have similar colors or shapes that differ from the colors or shapes of other objects of a different type. Additionally, although arrows are shown as visual indicators for relational links between objects, other visual indicators may be employed. For example, similar shape modifications may be made to objects that have a particular relationship. As another alternative, if the objects shown in the dialog are too numerous to clearly show their relationships, the user may optionally remove the relationship indicators, or the user may be required to perform some type of user action to request to see the relationships, e.g. by selecting a button or menu, in which case another window is generated to show relationships. Alternatively, the interface utility could automatically expand the interface utility window in order to obtain the visual area necessary to display relationships between objects.

In order to exploit all of the features of the AuthenticatedData interface utility shown in FIG. 3, users typically need to know about certificates and CRLs and, in some cases, the encryption and signing algorithms. However, the interface can pick up most of the values automatically by traversing the objects according to the accepted format or syntax provided the PKCS standards. For example, the private key can be matched to its certificate via a token or PKCS #12 file, and encryption and signing algorithms can be stored and retrieved from previous e-mails or user interface actions. It should be noted that files in PKCS #12 format typically store a certificate and its associated key pair. The contents of the PKCS #12 file are generally protected by a password or other key mechanism.

Dialog 300 in FIG. 3 is a graphical user interface window for a AuthenticatedData interface utility application that allows a user to view and manipulate cryptographic data objects formatted according to interoperably defined cryptography standards, and in particular, PKCS #7 AuthenticatedData objects. The user may optionally be provided with functionality to configure the AuthenticatedData interface utility with user preferences as to default actions, default methods of displaying certain objects, etc., in a manner known to those skilled in the art of graphical user interfaces.

In summary, the authenticated-data content type consists of content of any type, a message authentication code (MAC), and encrypted authentication keys for one or more recipients. The combination of the MAC and one encrypted authentication key for a recipient is necessary for that recipient to verify the integrity of the content. Any type of content can be integrity protected for an arbitrary number of recipients.

The process by which authenticated-data is constructed involves the following steps:
1. A message-authentication key for a particular message-authentication algorithm is generated at random.
2. The message-authentication key is encrypted for each recipient. The details of this encryption depend on the key management algorithm used.
3. For each recipient, the encrypted message-authentication key and other recipient-specific information are collected into a RecipientInfo value.
4. Using the message-authentication key, the originator computes a MAC value on the content. If the originator is authenticating any information in addition to the content, a message digest is calculated on the content, the message digest of the content and the other information are authenticated using the message-authentication key, and the result becomes the "MAC value."

AuthenticatedData 301 provides the name of the AuthenticatedData object that is currently being viewed within dialog 300.

Version 302 is the syntax version number for the AuthenticatedData object being displayed within dialog 300. As the standards for AuthenticatedData objects changes over time, various applications may create AuthenticatedData objects in accordance with different versions of the standard. The version number is stored within the AuthenticatedData object so that an application may know by which version of the standard the AuthenticatedData object should be parsed, interpreted, or decoded.

Attribute list 303 is a list of authenticated attributes associated with the AuthenticatedData object. Attribute list 304 is a list of unauthenticated attributes associated with the AuthenticatedData object. As there may be more than one attribute, the majority of the attributes may also be hidden within a drop-down list, or the names or identifiers of the attributes may be simultaneously shown within dialog 300.

The AuthenticatedData interface utility automatically updates the version and attributes as elements of the AuthenticatedData object are updated. Elements of a AuthenticatedData object are grouped by type into areas of the dialog window so that the user may visually grasp associated elements and their relationships. The user can drag and drop an object, such as a text file, onto Content area 350 of the dialog to update the contents with a new value.

RecipientInfo objects 310–311 are shown grouped within an area of dialog 300. Each RecipientInfo object or recipient information object designates to whom the MAC value data will be sent. Each RecipientInfo object contains an encrypted message authentication key on which recipients will need to use their private key to unlock. Users can specify their private key by using a keystore (e.g., PKCS #12) file that contains the private key or by using another token, such as a smart card, that stores the private key. Once the recipients have the unlocked encrypted message authentication key, they can decrypt the MAC value with the message authentication key. The user can select a RecipientInfo object and open a separate visual interface or dialog window to view and manipulate the objects contained within a selected RecipientInfo object, e.g. by double-clicking on a RecipientInfo object.

Certificate objects 321–324 are shown grouped within an area of dialog 300. This set of certificates are used to help the recipient of the AuthenticatedData object to identify the public key that was used to encrypt the message authentication key. The certificates will typically be in a certificate chain order. Arrows between certificates represent certificate chains that exist within the AuthenticatedData object, and arrows 325–326 between the certificate objects show the order from the entry level to the root certificate authority. More than one chain can be present, and not all certificates in the chain need to be present.

Arrows 327–328 between the RecipientInfo objects and the certificates indicate which certificate is related to a particular RecipientInfo object, i.e. the arrows indicate that the public key associated with a certificate was used to encrypt the message authentication key. For the interface to automatically add a RecipientInfo object, the user would have to add a certificate object to the interface. Along with the previously added or specified message authentication key, the interface would automatically encrypt the message authentication key with the public key of the added certificate. The interface would create a RecipientInfo object with the encrypted message authentication key along with other information, such as a reference to the certificate, and place the RecipientInfo object in the interface. The user can add certificates to the AuthenticatedData object by dragging and dropping the certificate object on the visual area. The interface utility will add the certificate to the certificate list. If desired by the user, the interface utility can automatically import the certificates from the configured certificate database to construct the certificate chain for the user after a certificate has been added. The user can select a certificate object and open a separate visual interface or dialog window to view and manipulate the attributes contained within the selected certificate object, e.g., by double-clicking on a certificate.

Certificate Revocation List (CRL) 330 is shown within an area of dialog 300 that is reserved for CRLs. The set of CRLs shown in dialog 300 are used to help the recipient of the AuthenticatedData object to identify which certificates should be flagged as invalid. Arrows between a CRL and a certificate object indicate which certificate has been revoked by a particular CRL, and arrow 331 indicates that certificate 322 has been revoked as indicated within CRL 330. If optionally configured by the user, the interface utility will consult a Lightweight Directory Access Protocol (LDAP) database and use the X.509 names in the certificate and CRL objects to determine which certificates should be revoked. The user can add CRLs to the AuthenticatedData object by dragging and dropping the CRL object on the CRL visual area. The interface utility will add the CRL to the CRL set. The user can also select a CRL object and open a separate visual interface or dialog window to view and manipulate the attributes contained within the selected CRL object, e.g. by double-clicking on a CRL object.

The MAC value section of dialog 300 contains Generate MAC Key button 343 that a user can press to automatically generate a MAC key based on the MAC key algorithm specified in MAC key algorithm 340 and parameters 342. The MAC key algorithm 341 is the algorithm of the message authentication key. When the MAC algorithm is applied to the contents with the message authentication key in 342, the MAC algorithm generates the MAC value 362. The algorithms are preferably displayed as a drop-down list that allows a user to choose among several types of algorithms.

Content area 350 displays content 352 that is contained within the AuthenticatedData object along with associated MAC value 352.

Existing AuthenticatedData objects could be dragged and dropped onto the interface to view a preconstructed AuthenticatedData object. The interface could also export a AuthenticatedData object that passes validation to a file or other transfer mechanism, such as the clipboard, in a DER-encoded format. Before the AuthenticatedData object is exported or stored, the interface will run the defined elements through a set of verification rules, presenting errors to the user if present. The same validation checks will also occur when a AuthenticatedData object is imported into the interface. Import button 361 allows the user to import a AuthenticatedData object from a specified DER-encoded file and populate the display objects. Export button 362 allows the user to store the AuthenticatedData object in a DER-encoded file.

With reference now to FIGS. 4A–4D, a flowchart depicts the processing of user actions within a dialog window of a AuthenticatedData interface utility for viewing and manipulating AuthenticatedData objects, such as the AuthenticatedData object shown in FIG. 3, in accordance with a preferred embodiment of the present invention. The process begins by waiting for a user action (step 401). In essence, the flowchart shows a main event loop for processing events within a graphical user interface. The process sits in the event loop monitoring for a user action, processing the user action, then returning to monitor for additional user actions.

A determination is then made as to whether the user has dropped a file object into the content section of the dialog (step 402). The interface then displays the content in the content section (step 403). A determination is then made as to whether a MAC key exists (step 404). If not, then the processing of the user action is complete. If so, then the interface calculates a MAC value on the content using the MAC algorithm and the MAC key and displays the result in the MAC value section (step 405). The processing of the user action is then complete, and the process branches back to step 401 to await another user action.

Within the main event loop, a determination may be made as to whether the user has requested to delete content, e.g. by selecting a data item within the content section and pressing the delete key (step 406). If so, then the content is deleted and the display is updated (step 407). If necessary, the MAC value is also removed from the display (step 408). The processing of the user action is then complete, and the processes branches back to step 401 to await another user action.

Within the main event loop, a determination may be made as to whether the user has requested to add a certificate, e.g. by dragging and dropping a certificate or PKCS #12 file object into the certificate list displayed within the interface dialog (step 409). If so, a determination is then made as to whether the certificate already exists (step 410). If so, then no further action is required and the processing of the user action is complete. If the certificate does not exist, then the certificate is added to the list of certificates (step 411). The process then checks each certificate in the list of certificates to see if the subjectDN for a certificate matches the issuerDN for another certificate (step 412). If not, then the process branches to step 414. Otherwise, one or more indicating links or arrows are drawn between the matching certificates (step 413). A determination is then made as to whether a MAC key exists (step 414). If not, then no further action is required, and the process returns to the main event loop. If a MAC key exists, then the user is prompted to determine whether a RecipientInfo object should be created (step 415). If not, then the processing of the user action is complete, and the process branches back to the main event loop. Otherwise, the process creates a RecipientInfo object and calculates the encrypted message authentication key for the RecipientInfo object using the public key of the certificate associated with the RecipientInfo object (step 416). The RecipientInfo object is then displayed with an indicating link or arrow between the RecipientInfo object and the associated certificate (step 417). The processing of the user action is then complete, and the process branches back to step 401.

Within the main event loop, a determination may be made as to whether the user has requested to delete a certificate, e.g. by selecting a certificate and pressing the delete key (step 418). A determination is then made as to whether the certificate is linked to a RecipientInfo object (step 419). If so, then the RecipientInfo object is deleted and the indicating link or arrow is removed from the display (step 420). The certificate is then deleted and the display updated (step 421). The processing of the user action is then complete, and the process branches back to the main event loop. If the certificate was not linked to a RecipientInfo object, then the certificate is simply deleted, and the display is updated at step 421. The processing of the user action is then complete, and the process branches back to step 401 to await another user action.

Within the main event loop, a determination may be made as to whether the user has requested to add a certificate revocation list (CRL), e.g. by dragging and dropping a CRL or PKCS #12 file object into the CRL list area of the interface dialog display (step 422). If so, then a determination is made as to whether the CRL already exists (step 423). If so, then the processing of the user action is complete, and the process branches back to the main event loop. If the CRL does not exist, then the CRL is added to the list of CRLs (step 424). The process then checks each certificate in the certificate list to see if the issuerDN and serialNumber for a certificate matches the issuerDN and a serialNumber and the CRL (step 425). If not, then the processing is complete, and process branches back to the main event loop. If there is a matching certificate, then one or more indicating links or arrows are drawn between the matching certificates and the CRL (step 426). The processing of the user action is then complete, and the process branches back to step 401 to await another user action.

Within the main event loop, a user may request the deletion of a CRL, e.g. by selecting a CRL and pressing the delete key (step 427). If so, then a determination is made as to whether the selected CRL is linked to a certificate (step 428). If so, the associated links are removed from the display (step 429), and the selected CRL is then deleted (step 430). If there are no certificates linked to the selected CRL, then the CRL is simply deleted at step 430. The processing of the user action is then complete, and the process branches back to step 401 to await another user action.

Within the main event loop, a determination may be made as to whether the user has specified a MAC key, e.g. by dragging and dropping a secret key file object into the MAC key area of the interface dialog display (step 431). If so, the secret key is decoded and displayed in the MAC key section, thereby replacing any existing key (step 432). A determination is made as to whether content exists in the content section (step 433). If so, then a MAC value is calculated with a MAC key, and the MAC algorithm is displayed in the MAC value section (step 434). After calculating the MAC key, or if content did not exist, then the process loops through the RecipientInfo objects (step 435). For each RecipientInfo object, the process recalculates the encrypted message authentication key for the RecipientInfo object using the public key of the certificate associated with the RecipientInfo object (step 436). A determination is made as to whether there are additional RecipientInfo objects to be processed (step 437). If so, then the process branches back to step 435 to process another RecipientInfo object. If not, then the processing of the user action is complete, and the process branches back to step 401 to await another user action.

Within the main event loop, a determination may be made as to whether the user has requested to delete a MAC key, e.g. by selecting a MAC key algorithm from the drop down list on the display and pressing the delete key (step 438). If so, then the existing MAC key is deleted (step 439), and the process loops through the RecipientInfo objects (step 440). For each RecipientInfo object, the process removes the encrypted message authentication key that is being deleted (step 441). A determination is then made as to whether other RecipientInfo objects need to be processed (step 442). If so, the process branches back to step 440. If not, then the processing of the user action is completed, and the process branches back to step 401 to await another user action.

Within the main event loop, a determination may be made as to whether the user has requested to generate a MAC key, e.g. by selecting a Generate MAC Key button (step 443). If so, then the MAC key is generated and displayed in the MAC key section of the interface dialog (step 444). A determination is then made as to whether content exists in the content section of the interface dialog (step 445). If so, then a MAC value is calculated with the MAC key and the MAC algorithm and displayed in the MAC value section (step 446). After calculating the MAC value, or if content does not exist, then the process loops through the list of RecipientInfo objects (step 447). For each RecipientInfo object, the process recalculates the encrypted message authentication key for the RecipientInfo object using the public key of the certificate associated with the RecipientInfo object (step 448). A determination is then made as to whether there are other RecipientInfo objects to be processed (step 449). If so, the process branches back to step 447 to process another RecipientInfo object. If not, then the processing of the user action is complete, and the process branches back to step 401 to await another user action.

Within the main event loop, a user may request to add an attribute, e.g. by right-clicking in the attribute list (step 450). If so, then the interface dialog displays an attribute dialog window with a check box for an authenticated or unauthenticated attribute (step 451). After the user has entered an attribute, a determination is made as to whether the user has requested to save the attribute (step 452). If not, then the attribute dialog is closed, and the processing of the user action is complete. If the user desires to save the attribute, it is added to the attribute list according to the authenticated selection, thereby replacing any attribute with the same name (step 453). The processing of the user action is then complete, and the process branches back to step 401 to await another user action.

Within the main event loop, a determination may be made as to whether a user has requested to view or edit an attribute, e.g. by double-clicking on the attribute list (step 454). The interface utility then displays the attribute dialog with the selected attribute (step 455). At this point, the name of the attribute and the authenticated check box are read-only. In other words, the user may only change the value of the attribute without modifying the name of the attribute. A determination is made as to whether the user desires to save any changes to the attribute (step 456). If not, the attribute dialog is closed, and the processing of the user action is complete. If the user desires to save the attribute, then the updated attribute replaces the selected attribute in the attribute list (step 457). The attribute dialog is then closed, and the process branches back to step 401 to await another user action.

Within the main event loop, a determination may be made as to whether the user has requested to delete an attribute, e.g. by selecting an attribute from the attribute list and pressing the delete key (step 458). If so, then the attribute is deleted and the display is updated (step 459). The processing of the user action is then complete, and the process branches back to step 401 to await another user action.

Within the main event loop, a determination may be made as to whether the user has requested to delete a RecipientInfo object, e.g. by selecting a RecipientInfo object and pressing the delete key (step 460). If so, the RecipientInfo object is deleted and the display is updated (step 461). The processing of the user action is then complete, and the process branches back to step 401 to await another user action.

Within the main event loop, a determination may be made as to whether the user has requested to view a certificate object, e.g. by double-clicking on a certificate object (step 462). If so, then the certificate information is displayed in a certificate dialog (step 465). The dialog may be closed by the user, and the processing of the user action is then complete. The process then branches back to step 401 to await another user action.

Within the main event loop, a determination may be made as to whether the user has requested to view a CRL object, e.g. by double-clicking on a CRL object (step 464). If so, then the contents of the CRL are displayed in a CRL dialog (step 465). The user may then close the dialog, and the processing of the user action is then complete. The process branches back to step 401 to await another user action.

Within the main event loop, a determination may be made as to whether the user has requested to view a RecipientInfo object, e.g. by double-clicking on a RecipientInfo object (step 466). If so, the interface displays the contents of the RecipientInfo object in a RecipientInfo dialog (step 467). The user may close the dialog, and the processing of the user action is then complete. The process then branches back to step 401 to await another user action.

Within the main event loop, a determination may be made as to whether the user has requested to view a content object, e.g. by double-clicking on the content object (step 468). If so, then the contents are displayed in the manner, which is appropriate for the content type (step 469). For example, if the contents have an associated type of "text", then the contents may be displayed in the default text editor of the computer system. The process then branches back to step 401 to await another user action.

Within the main event loop, a determination may be made as to whether the user has pressed the Export button (step 470). If so, then the user is prompted for a file name (step 471), and the AuthenticatedData object is stored in DER-encoded format to the specified file name (step 472). The processing of the user action is then complete, and the process branches back to step 401 to await another user action.

Within the main event loop, a determination may be made as to whether the user has pressed the Import button (step 473). If so, then the user is prompted for a file name (step 474), and the process imports the AuthenticatedData object from the specified DER-encoded file and populates the display objects (step 475). The processing of the user action is then complete, and the process branches back to step 401 to await another user action.

Within the main event loop, a determination may be made that the event constitutes an unknown user action (step 476). The unknown user action is then ignored, and the process branches back to step 401 to await another user action.

With reference now to FIG. 5A, a dialog window for presenting RecipientInfo object information is shown for viewing a RecipientInfo object selected by a user within a AuthenticatedData interface utility dialog window in accordance with a preferred embodiment of the present invention. Dialog 500 contains Close button 501 for allowing a user to close dialog 500 when the user has finished viewing the RecipientInfo object information. Content value fields 510–515 display the values of various content elements within a RecipientInfo object, which are obtained from the selected certificate by parsing the elements of the RecipientInfo object according to a known, standard format, such as that shown in FIG. 5B.

Figure 8:
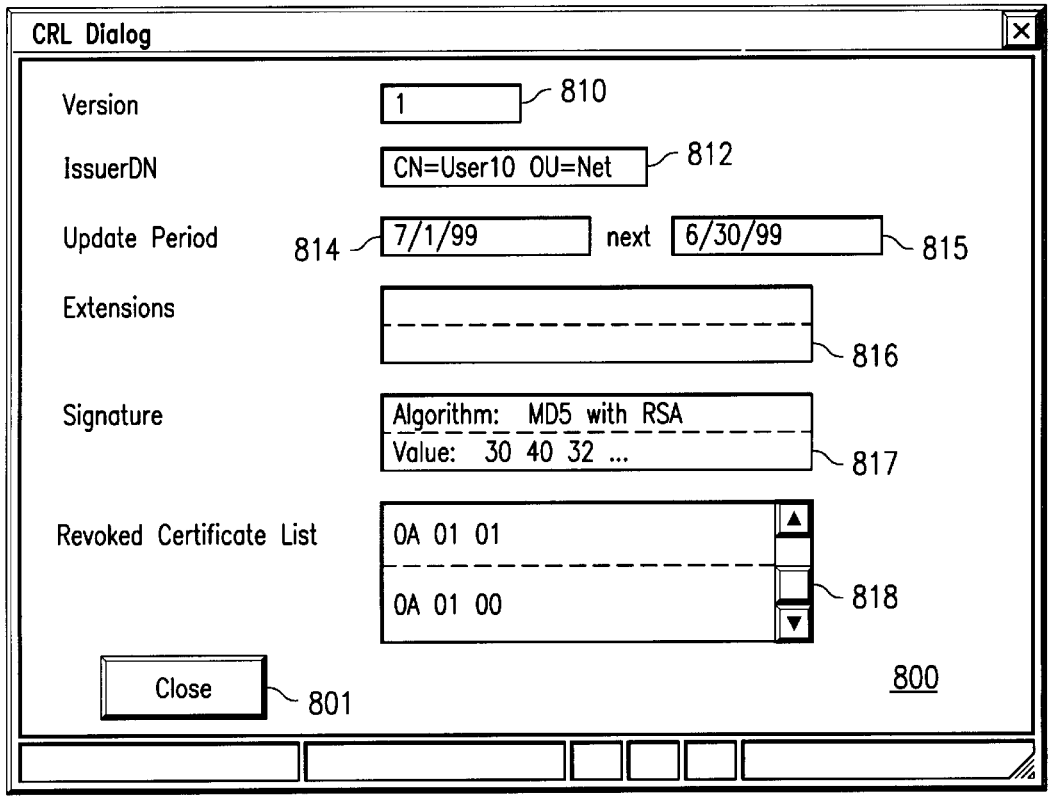
FIG. 8 depicts a dialog window for presenting certificate revocation list (CRL) information for a CRL selected by a user within a AuthenticatedData interface utility dialog window in accordance with a preferred embodiment of the present invention.

With reference now to FIG. 5B, the format of a PKCS RecipientInfo object data type is shown. A RecipientInfo object may be placed into a AuthenticatedData object on a per-signer basis. As is apparent by a simple inspection of both FIG. 5A and FIG. 5B, each element within a RecipientInfo object may appear as a content value field within a dialog window for viewing RecipientInfo objects, such as dialog 500. In a similar manner, the certificate and certificate revocation list information may also be shown within a dialog window when these objects are selected by the user, as shown in FIG. 7 and FIG. 8.

RecipientInfo has a different format for the three key management techniques that are supported: key transport, key agreement, and previously distributed symmetric key-encryption keys. In all cases, the content-encryption key is transferred to one or more recipient in encrypted form. Any of the three key management techniques can be used for each recipient of the same encrypted content. For example, per-recipient information using key transport is represented in the type KeyTransRecipientInfo, as shown in FIG. 5B. Each instance of KeyTransRecipientInfo transfers the content-encryption key to one recipient.

Figure 6:
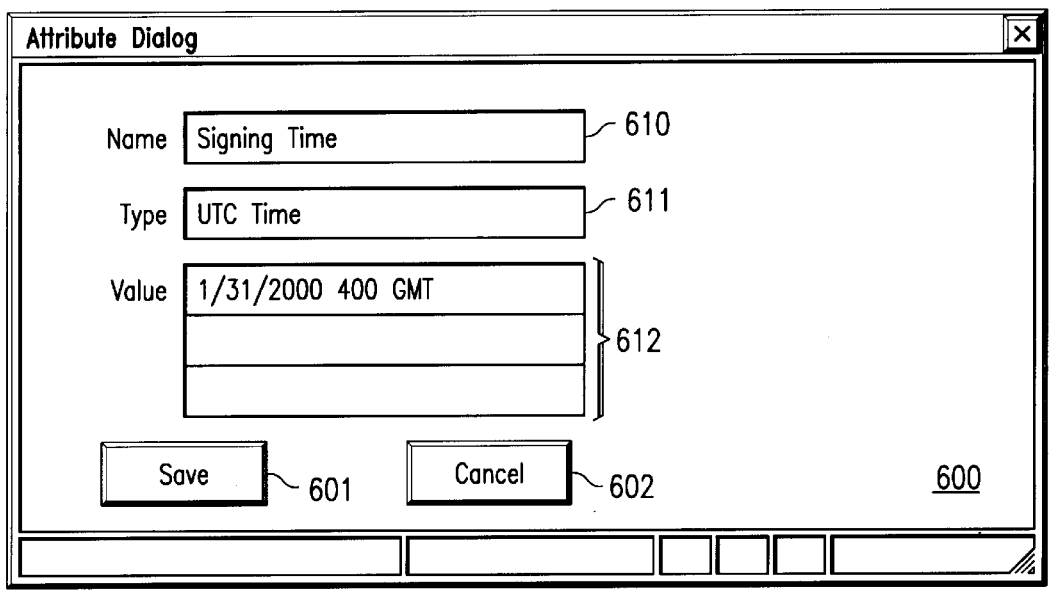
FIG. 6 is a dialog window for presenting attribute information for an attribute selected by a user within a AuthenticatedData interface utility dialog window.

With reference now to FIG. 6, a dialog window for presenting attribute information is shown for viewing an attribute selected by a user within a AuthenticatedData interface utility dialog window in accordance with a preferred embodiment of the present invention. Dialog 600 contains Close button 601 for allowing a user to close dialog 600 when the user has finished viewing the attribute information. Content value fields 610–612 display the values of various content elements within an attribute, which are obtained from the selected data object according to a known, standard format may vary depending upon the many types of attributes supported in various standards.

Figure 7:
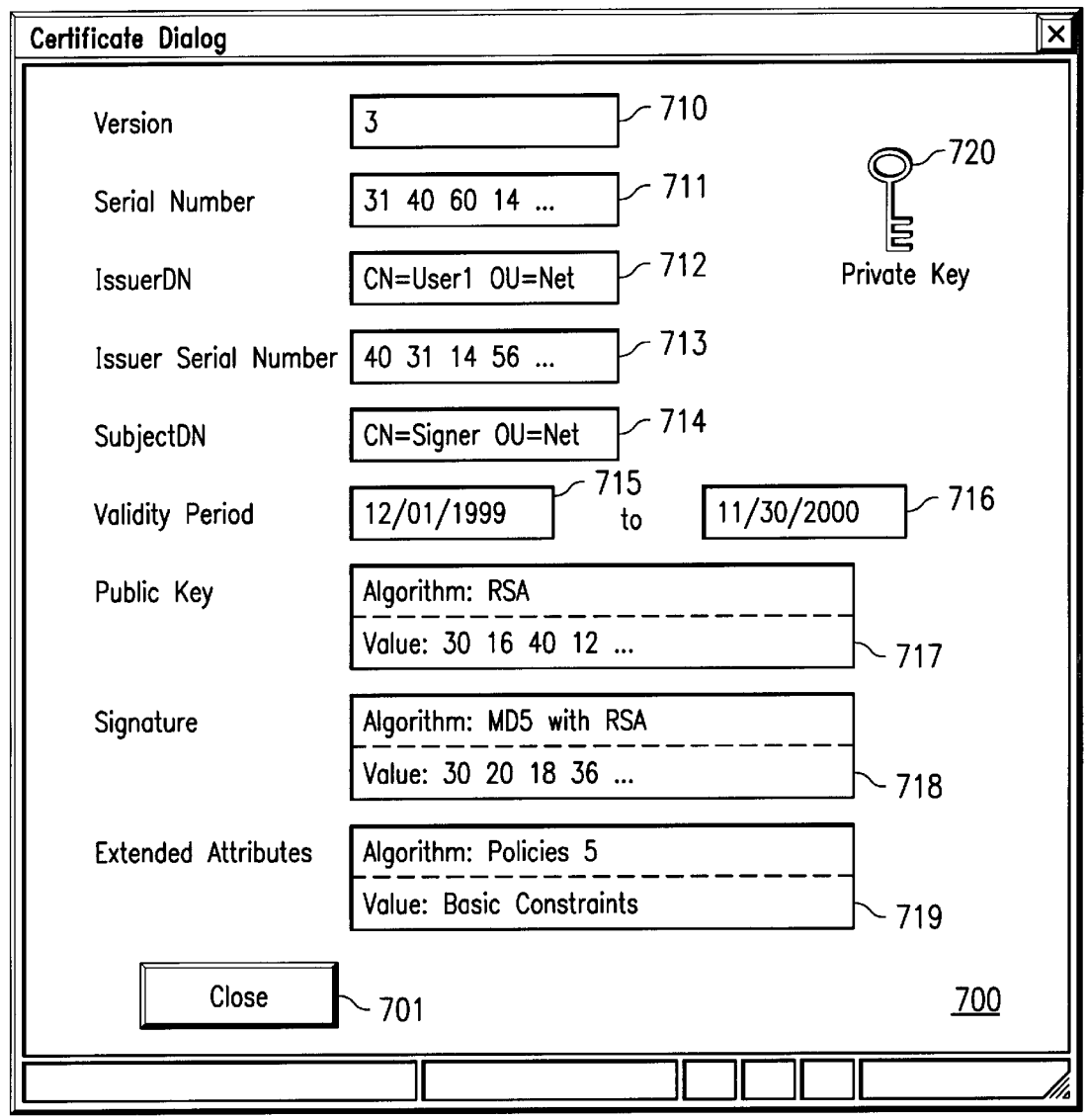
FIG. 7 depicts a dialog window for presenting certificate information for certificates selected by a user within a AuthenticatedData interface utility dialog window.

With reference now to FIG. 7, a dialog window for presenting certificate information is shown for viewing certificates selected by a user within a AuthenticatedData interface utility dialog window in accordance with a preferred embodiment of the present invention. Dialog 700 contains Close button 701 for allowing a user to close dialog 700 when the user has finished viewing the certificate information. Content value fields 710–719 display the values of various content elements within a certificate, which are obtained from the selected certificate by parsing the elements of the certificate according to a known, standard format. Private key symbol 720 shows if the interface has internally associated a private key with the certificate. If the interface did not associate a private key with the certificate, the dialog would display a private key icon with a slash symbol through it. The interface will associate the private key with a certificate (the public key in the certificate), if the user dropped a PKCS #12 file on the interface that contained a private key and certificate, for example.

With reference now to FIG. 8, a dialog window for presenting certificate revocation list (CRL) information is shown for viewing a CRL selected by a user within a AuthenticatedData interface utility dialog window in accordance with a preferred embodiment of the present invention. Dialog 800 contains Close button 801 for allowing a user to close dialog 800 when the user has finished viewing the CRL information. Content value fields 810–818 display the values of various content elements within a CRL, which are obtained from the selected CRL by parsing the elements of the CRL according to a known, standard format.

The advantages of the present invention are apparent in view of the detailed description of the invention provided above. The present invention provides a graphical user interface methodology for presenting and manipulating PKCS #7 AuthenticatedData objects. The system automatically decomposes a AuthenticatedData object and displays relationships between contained objects for rapid visual comprehension and ease of manipulation by various types of users, including system administrators, network administrators, and application developers. Users have a comprehensive, visual view of the AuthenticatedData object and its contents. A user may then easily change and refresh the contents of the AuthenticatedData object. Objects can be added via drag and drop operations or through conventional file or socket imports. The present invention is operable in a heterogeneous environment since the methodology can encode and decode DER-encoded objects that may be transmitted to and received from various types of computer systems. As concerns over data security and data integrity become more prevalent with the increasing amounts of e-commerce, the use of cryptographic objects will also grow as they become a desired requirement between merchants that commercially interact.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention the practical application and to enable others of ordinary skill in the art to understand the invention for various embodiments with various modifications as are suited to the particular use contemplated.

What is claimed is:

1. A method for processing authenticated data objects in a data processing system comprising a display, the method comprising the computer-implemented steps of:

presenting an authenticated data object; and modifying the authenticated data object through processing of user actions within a graphical user interface.

2. The method of claim 1 wherein the authenticated data object is formatted according to PKCS (Private Key Cryptography Standard) standards.

3. The method of claim 1 wherein the step of presenting the authenticated data object further comprises:

obtaining an authenticated data object, wherein the authenticated data object comprises a content data object and at least one message authentication key;

determining data objects contained with the authenticated data object;

displaying the authenticated data object, wherein data objects contained within the authenticated data object are represented by graphical objects;

determining logical associations between data objects contained within the authenticated data object; and displaying visual indicators between graphical objects, wherein the visual indicators represent logical associations between data objects contained within the authenticated data object.

4. The method of claim 3 wherein the step of modifying the authenticated data object further comprises:

selecting a graphical object representing a data object contained within the authenticated data object;

displaying data values of the selected data object;

editing the data values of the selected data object; and saving the data values of the selected data object in the authenticated data object.

5. The method of claim 4 further comprising:

identifying a data type of the data object represented by the selected graphical object, wherein the selected data object is a content data object; and identifying a default editor for displaying the selected data object according to the identified data type of the data object represented by the selected graphical object.

6. The method of claim 4 wherein the step of modifying the authenticated data object further comprises:

selecting a graphical object representing a data object contained within the authenticated data object;

receiving a user action on the selected graphical object representing a deletion request; and deleting from the authenticated data object the data object represented by the selected graphical request.

7. The method of claim 6 further comprising:

determining whether the selected graphical object represents a certificate object;

in response to a determination that the selected graphical object represents a certificate object, determining whether the certificate object is logically associated with a different certificate object embedded within the authenticated data object;

in response to a determination that the certificate object is logically associated with a different certificate object embedded within the authenticated data object, removing a visual indicator representing a logical association between the certificate object and the different certificate object;

determining whether the certificate object is logically associated with a recipient information object;

in response to a determination that the certificate object is logically associated with a recipient information object:

deleting the recipient information object; and removing a visual indicator representing a logical association between the certificate object and the recipient information object.

8. The method of claim 6 further comprising:

determining whether the selected graphical object represents a certificate revocation list object;

in response to a determination that the selected graphical object represents a certificate revocation list object, determining whether the certificate revocation list object is logically associated with a certificate object; and in response to a determination that the certificate revocation list object is logically associated with a certificate object, removing a visual indicator representing a logical association between the certificate object and the certificate revocation list object.

9. The method of claim 6 further comprising:

determining whether the selected graphical object represents a content data object;

in response to a determination that the selected graphical object represents a content data object, removing an associated message authentication code value from the display.

10. The method of claim 3 further comprising:

receiving a user request to export the authenticated data object;

obtaining a user-specified file name; and storing the authenticated data object in DER-encoded format in the user-specified file.

11. The method of claim 3 further comprising:

receiving a user request to import the authenticated data object;

obtaining a user-specified file name;

importing the authenticated data object in DER-encoded format from the user-specified file; and populating the graphical objects representing data objects contained within the authenticated data object.

12. The method of claim 1 further comprising:

receiving a user request to add a content data object to the authenticated data object;

determining whether a message authentication key is embedded in the authenticated data object;

in response to a determination that a message authentication key is embedded in the authenticated data object, generating an encapsulated content data object with a message authentication code value within the authenticated data object, wherein the encapsulated data object comprises the content data object and a content type identifier for the content data object; and displaying the message authentication code value.

13. The method of claim 12 further comprising:

dragging and dropping a graphical object representing the content data object on a graphical object representing the authenticated data object.

14. The method of claim 1 further comprising:

receiving a user request to add a certificate object to the authenticated data object;

storing the certificate object in the authenticated data object; and displaying a graphical object representing the certificate object, wherein the graphical object indicates that the certificate object is embedded within the authenticated data object.

15. The method of claim 14 further comprising:

determining whether the certificate object is logically associated with a different certificate object embedded within the authenticated data object; and in response to a determination that the certificate object is logically associated with a different certificate object embedded within the authenticated data object, displaying a visual indicator representing a logical association between the certificate object and the different certificate object.

16. The method of claim 14 further comprising:

determining whether a message authentication key is embedded in the authenticated data object;

in response to a determination that a message authentication key is embedded in the authenticated data object, receiving user input requesting generation of a recipient information object;

generating a recipient information object;

storing the recipient information object in the authenticated data object; and displaying a graphical object representing the recipient information object, wherein the graphical object indicates that the recipient information object is embedded with in the authenticated data object; and displaying a visual indicator representing a logical association between the recipient information object and an associated certificate object.

17. The method of claim 14 further comprising:

dragging and dropping a graphical object representing the certificate object on a graphical object representing the authenticated data object.

18. The method of claim 1 further comprising:

receiving a user request to add a certificate revocation list object to the authenticated data object;

storing the certificate revocation list object in the authenticated data object; and displaying a graphical object representing the certificate revocation list object, wherein the graphical object indicates that the certificate revocation list object is embedded within the authenticated data object.

19. The method of claim 18 further comprising:

determining whether the certificate revocation list object is logically associated with a certificate object embedded within the authenticated data object; and in response to a determination that the certificate revocation list object is logically associated with a certificate object embedded within the authenticated data object, displaying a visual indicator representing a logical association between the certificate revocation list object and the certificate object.

20. The method of claim 18 further comprising:

dragging and dropping a graphical object representing the certificate revocation list object on a graphical object representing the authenticated data object.

21. The method of claim 3 further comprising:

receiving a user request to select a message authentication code key algorithm;

deleting a message authentication key embedded in the authenticated data object; and removing the message authentication key from recipient information objects embedded in the authenticated data object.

22. A data processing system for processing authenticated data objects in the data processing system comprising a display, the data processing system comprising:

presenting means for presenting an authenticated data object; and modifying means for modifying the authenticated data object through processing of user actions within a graphical user interface.

23. The data processing system of claim 22 wherein the authenticated data object is formatted according to PKCS (Private Key Cryptography Standard) standards.

24. The data processing system of claim 22 wherein the presenting means for presenting the authenticated data object further comprises:

first obtaining means for obtaining an authenticated data object, wherein the authenticated data object comprises a content data object and at least one message authentication key;

first determining means for determining data objects contained with the authenticated data object;

first displaying means for displaying the authenticated data object, wherein data objects contained within the authenticated data object are represented by graphical objects;

second determining means for determining logical associations between data objects contained within the authenticated data object; and second displaying means for displaying visual indicators between graphical objects, wherein the visual indicators represent logical associations between data objects contained within the authenticated data object.

25. The data processing system of claim 24 wherein the modifying means for modifying the authenticated data object further comprises:

first selecting means for selecting a graphical object representing a data object contained within the authenticated data object;

third displaying means for displaying data values of the selected data object;

first editing means for editing the data values of the selected data object; and first saving means for saving the data values of the selected data object in the authenticated data object.

26. The data processing system of claim 25 further comprising:
  first identifying means for identifying a data type of the data object represented by the selected graphical object, wherein the selected data object is a content data object; and
  second identifying means for identifying a default editor for displaying the selected data object according to the identified data type of the data object represented by the selected graphical object.

27. The data processing system of claim 25 wherein the modifying means for modifying the authenticated data object further comprises:
  second selecting means for selecting a graphical object representing a data object contained within the authenticated data object;
  first receiving means for receiving a user action on the selected graphical object representing a deletion request; and
  first deleting means for deleting from the authenticated data object the data object represented by the selected graphical request.

28. The data processing system of claim 27 further comprising:
  third determining means for determining whether the selected graphical object represents a certificate object;
  fourth determining means for determining, in response to a determination that the selected graphical object represents a certificate object, whether the certificate object is logically associated with a different certificate object embedded within the authenticated data object;
  first removing means for removing, in response to a determination that the certificate object is logically associated with a different certificate object embedded within the authenticated data object, a visual indicator representing a logical association between the certificate object and the different certificate object;
  fifth determining means for determining whether the certificate object is logically associated with a recipient information object;
  second deleting means for deleting, in response to a determination that the certificate object is logically associated with a recipient information object, the recipient information object; and
  second removing means for removing a visual indicator representing a logical association between the certificate object and the recipient information object.

29. The data processing system of claim 27 further comprising:
  sixth determining means for determining whether the selected graphical object represents a certificate revocation list object;
  seventh determining means for determining, in response to a determination that the selected graphical object represents a certificate revocation list object, whether the certificate revocation list object is logically associated with a certificate object; and
  third removing means for removing, in response to a determination that the certificate revocation list object is logically associated with a certificate object, a visual indicator representing a logical association between the certificate object and the certificate revocation list object.

30. The data processing system of claim 27 further comprising:
  eighth determining means for determining whether the selected graphical object represents a content data object;
  fourth removing means for removing, in response to a determination that the selected graphical object represents a content data object, an associated message authentication code value from the display.

31. The data processing system of claim 24 further comprising:
  second receiving means for receiving a user request to export the authenticated data object;
  second obtaining means for obtaining a user-specified file name; and
  first storing means for storing the authenticated data object in DER-encoded format in the user-specified file.

32. The data processing system of claim 24 further comprising:
  third receiving means for receiving a user request to import the authenticated data object;
  third obtaining means for obtaining a user-specified file name;
  first importing means for importing the authenticated data object in DER-encoded format from the user-specified file; and
  first populating means for populating the graphical objects representing data objects contained within the authenticated data object.

33. The data processing system of claim 22 further comprising:
  third receiving means for receiving a user request to add a content data object to the authenticated data object;
  ninth determining means for determining whether a message authentication key is embedded in the authenticated data object;
  first generating means for generating, in response to a determination that a message authentication key is embedded in the authenticated data object, an encapsulated content data object with a message authentication code value within the authenticated data object, wherein the encapsulated data object comprises the content data object and a content type identifier for the content data object; and
  third displaying means for displaying the message authentication code value.

34. The data processing system of claim 33 further comprising:
  first dragging and dropping means for dragging and dropping a graphical object representing the content data object on a graphical object representing the authenticated data object.

35. The data processing system of claim 22 further comprising:
  fourth receiving means for receiving a user request to add a certificate object to the authenticated data object;
  second storing means for storing the certificate object in the authenticated data object; and
  fourth displaying means for displaying a graphical object representing the certificate object, wherein the graphical object indicates that the certificate object is embedded within the authenticated data object.

36. The data processing system of claim 35 further comprising:
  tenth determining whether the certificate object is logically associated with a different certificate object embedded within the authenticated data object; and
  fifth displaying means for displaying, in response to a determination that the certificate object is logically associated with a different certificate object embedded within the authenticated data object, a visual indicator representing a logical association between the certificate object and the different certificate object.

37. The data processing system of claim 35 further comprising:

eleventh determining means for determining whether a message authentication key is embedded in the authenticated data object;

fourth receiving means for receiving, in response to a determination that a message authentication key is embedded in the authenticated data object, user input requesting generation of a recipient information object;

second generating means for generating a recipient information object;

third storing means for storing the recipient information object in the authenticated data object; and sixth displaying means for displaying a graphical object representing the recipient information object, wherein the graphical object indicates that the recipient information object is embedded within the authenticated data object; and seventh displaying means for displaying a visual indicator representing a logical association between the recipient information object and an associated certificate object.

38. The data processing system of claim 35 further comprising:

second dragging and dropping means for dragging and dropping a graphical object representing the certificate object on a graphical object representing the authenticated data object.

39. The data processing system of claim 22 further comprising:

fifth receiving means for receiving a user request to add a certificate revocation list object to the authenticated data object;

fourth storing means for storing the certificate revocation list object in the authenticated data object; and eighth displaying means for displaying a graphical object representing the certificate revocation list object, wherein the graphical object indicates that the certificate revocation list object is embedded within the authenticated data object.

40. The data processing system of claim 39 further comprising:

twelfth determining means for determining whether the certificate revocation list object is logically associated with a certificate object embedded within the authenticated data object; and ninth displaying means for displaying, in response to a determination that the certificate revocation list object is logically associated with a certificate object embedded within the authenticated data object, a visual indicator representing a logical association between the certificate revocation list object and the certificate object.

41. The data processing system of claim 39 further comprising:

third dragging and dropping means for dragging and dropping a graphical object representing the certificate revocation list object on a graphical object representing the authenticated data object.

42. The data processing system of claim 24 further comprising:

sixth receiving means for receiving a user request to select a message authentication code key algorithm;

third deleting means for deleting a message authentication key embedded in the authenticated data object; and fourth removing means for removing the message authentication key from recipient information objects embedded in the authenticated data object.

43. A computer program product in a computer-readable medium for use in a data processing system for processing authenticated data objects, the computer program product comprising:

first instructions for presenting an authenticated data object; and second instructions for modifying the authenticated data object through processing of user actions within a graphical user interface.

44. The computer program product of claim 43 wherein the authenticated data object is formatted according to PKCS (Private Key Cryptography Standard) standards.

45. The computer program product of claim 43 wherein the first instructions for presenting the authenticated data object further comprises:

instructions for obtaining an authenticated data object, wherein the authenticated data object comprises a content data object and at least one message authentication key;

instructions for determining data objects contained with the authenticated data object;

instructions for displaying the authenticated data object, wherein data objects contained within the authenticated data object are represented by graphical objects;

instructions for determining logical associations between data objects contained within the authenticated data object; and instructions for displaying visual indicators between graphical objects, wherein the visual indicators represent logical associations between data objects contained within the authenticated data object.

46. The computer program product of claim 45 wherein the second instructions for modifying the authenticated data object further comprises:

instructions for selecting a graphical object representing a data object contained within the authenticated data object;

instructions for displaying data values of the selected data object;

instructions for editing the data values of the selected data object; and instructions for saving the data values of the selected data object in the authenticated data object.

* * * * *

UNITED STATES PATENT AND TRADEMARK OFFICE
CERTIFICATE OF CORRECTION

PATENT NO. : 6,775,771 B1
DATED : August 10, 2004
INVENTOR(S) : Schrader et al.

It is certified that error appears in the above-identified patent and that said Letters Patent is hereby corrected as shown below:

Column 9,
Line 47, after "keys", insert -- and a wallet --.

Column 21,
Line 47, before "the authenticated", delete "with in" and insert -- within --.

Signed and Sealed this

Twenty-seventh Day of December, 2005

JON W. DUDAS
*Director of the United States Patent and Trademark Office*